United States Patent
Lucas et al.

(10) Patent No.: US 6,333,365 B1
(45) Date of Patent: Dec. 25, 2001

(54) STABLE, FOAMED CAULK AND SEALANT COMPOUNDS AND METHODS OF USE THEREOF

(75) Inventors: Patrick J. Lucas, Springboro; Anthony J. Taylor, Medina, both of OH (US)

(73) Assignee: Dap Products Inc., Baltimore, MD (US)

( * ) Notice: Subject to any disclaimer, the term of this patent is extended or adjusted under 35 U.S.C. 154(b) by 0 days.

(21) Appl. No.: 09/255,000

(22) PCT Filed: Aug. 29, 1997

(86) PCT No.: PCT/US97/14174

§ 371 Date: May 26, 1999

§ 102(e) Date: May 26, 1999

(87) PCT Pub. No.: WO98/12247

PCT Pub. Date: Mar. 26, 1998

Related U.S. Application Data
(60) Provisional application No. 60/047,915, filed on May 29, 1997, and provisional application No. 60/026,333, filed on Sep. 19, 1996.

(51) Int. Cl.$^7$ .................. C08J 9/28; C08J 9/30
(52) U.S. Cl. ............... 521/78; 521/64; 521/65; 521/72
(58) Field of Search .................. 521/78, 64, 65, 521/72

(56) References Cited

U.S. PATENT DOCUMENTS

| | | | |
|---|---|---|---|
| 406,585 | 7/1889 | King . | |
| 2,016,986 | 10/1935 | Case | 106/24 |
| 3,317,140 | 5/1967 | Smith | 239/107 |
| 3,346,195 | 10/1967 | Groth | 239/337 |
| 3,687,890 | 8/1972 | Susuki et al. | 260/41 R |
| 3,705,669 | 12/1972 | Cox et al. | 222/394 |
| 3,843,586 | 10/1974 | Wolf | 260/29.7 R |
| 3,912,665 | 10/1975 | Spitzer et al. | 260/2.5 E |
| 3,912,666 | 10/1975 | Spitzer et al. | 260/2.5 E |
| 3,912,667 | 10/1975 | Spitzer et al. | 260/2.5 E |
| 4,036,673 | 7/1977 | Murphy et al. | 156/71 |
| 4,123,005 | 10/1978 | Blunk | 239/327 |
| 4,277,568 | 7/1981 | Davison et al. | 521/68 |
| 4,328,319 | 5/1982 | Osipow et al. | 521/78 |
| 4,350,774 | 9/1982 | Scotti et al. | 521/95 |
| 4,364,521 | 12/1982 | Stankowitz | 239/346 |
| 4,381,066 | 4/1983 | Page et al. | 222/394 |
| 4,384,661 | 5/1983 | Page et al. | 222/394 |
| 4,422,877 | 12/1983 | Spitzer et al. | 106/122 |
| 4,501,825 | 2/1985 | Magyar et al. | 521/78 |
| 4,504,602 | 3/1985 | O'Connell et al. | 521/78 |
| 4,559,369 | 12/1985 | Bauman et al. | 521/98 |
| 4,584,324 | 4/1986 | Bauman et al. | 521/88 |
| 4,585,324 | 4/1986 | Koyama et al. | 355/3 R |
| 4,692,473 | 9/1987 | Wright et al. | 521/72 |
| 4,855,349 | 8/1989 | Ingle | 524/432 |
| 4,863,518 | 9/1989 | Blount | 106/74 |
| 4,931,479 | 6/1990 | Morgan | 521/76 |
| 4,940,844 | 7/1990 | Blunt | 521/116 |
| 4,960,802 | 10/1990 | DIStefano | 521/72 |
| 4,996,240 | 2/1991 | Osipow et al. | 521/78 |
| 4,999,383 | 3/1991 | Blount | 521/103 |
| 5,037,011 | 8/1991 | Woods | 222/394 |
| 5,055,511 | 10/1991 | Ingle | 524/406 |
| 5,073,445 | 12/1991 | Ingle | 428/314.4 |
| 5,084,503 | 1/1992 | Iacoviello | 524/459 |
| 5,089,160 | 2/1992 | Pallone et al. | 252/90 |
| 5,120,607 | 6/1992 | Ingle | 428/423.1 |
| 5,135,813 | 8/1992 | Ingle | 428/423.1 |
| 5,180,753 | 1/1993 | Osipow et al. | 521/65 |
| 5,188,263 | 2/1993 | Woods | 222/394 |
| 5,252,622 | 10/1993 | DIStefano | 521/65 |
| 5,254,599 | 10/1993 | Frank | 521/65 |
| 5,331,016 | 7/1994 | Frank et al. | 521/64 |
| 5,334,655 | 8/1994 | Carlson et al. | 524/804 |
| 5,338,776 | 8/1994 | Peelor et al. | 523/166 |
| 5,341,970 | 8/1994 | Woods | 222/394 |
| 5,360,826 | 11/1994 | Egolf et al. | 521/54 |
| 5,476,879 | 12/1995 | Woods et al. | 521/78 |
| 5,480,589 | 1/1996 | Belser et al. | 261/76 |
| 5,505,344 | 4/1996 | Woods | 222/394 |

FOREIGN PATENT DOCUMENTS

| | | | |
|---|---|---|---|
| 1151350 | 2/1983 | (CA) | 403/55 |
| 2947999 | 6/1980 | (DE) . | |
| 2915467 | 10/1980 | (DE) . | |
| 1536312 | 12/1978 | (GB) . | |
| 9114724 | 10/1991 | (WO) . | |
| 9319116 | 9/1993 | (WO) . | |
| 9612759 | 5/1996 | (WO) . | |

OTHER PUBLICATIONS

Surfactants and Interfacial Phenomena 2nd Edition, Milton J Rosen, pp. 293–299. Handbook of Aerosol Technology Second Edition, Van Nostrand Reinhold Company, 1979, pp. 358–359.

Handbook of Aerosol Technology Second Edition, Van Nostrand Reinhold Company, 1979, pp. 358–359.

*Primary Examiner*—Morton Foelak
(74) *Attorney, Agent, or Firm*—Biebel & French

(57) ABSTRACT

Stable foam caulk, sealant and insulation compositions are disclosed. The compositions comprise a waxy, solid foam stabilizer and a liquid lithophilic surfactant having low HLB value of about 3–14. The foam stabilizer provides stable support for bubbles formed from the drying of the latex emulsion of film forming polymer, and the volatile liquid hydrocarbon propellant. In addition to the use in caulking sealant or insulation methods, the compositions can be used to form artificial terrains or other hardenable structural surfaces as backgrounds or support means for hobbies, crafts and the like.

17 Claims, 5 Drawing Sheets

US 6,333,365 B1

STABLE, FOAMED CAULK AND SEALANT COMPOUNDS AND METHODS OF USE THEREOF

This application is a 371 of PCT/US97/14174 filed Aug. 29, 1997 and PROVISIONAL APPLICATION NO. 60/026,333 filed Sep. 19, 1996 and PROVISIONAL APPLICATION NO. 60/047,915 filed May 29, 1997.

FIELD OF THE INVENTION

The present invention pertains to foamable compositions that, upon foamed release thereof from an aerosol canister or the like, present a stable foamed product capable of use as a caulk, sealant, or insulating compound.

BACKGROUND OF THE INVENTION

Caulking, insulation and sealant compositions are used to seal joints and other voids and to reinforce framing, tiles, panels lathing, wall board and other structural assemblies. Foamed application of such compositions from pressurized containers and the like is highly desirable due primarily to overall ease of application. Easy clean up concerns require that such foamed products should be washed off with simple water and soap solutions.

Some of the available foamed compositions are not stable and shrink excessively after foamed application to the desired structure. Quite obviously, these products therefore fail in providing overall sealing or insulating efficacy. Moreover, other foamed products tend to sag or drip after application, again leading to failure.

It is accordingly an object to provide a foamable caulk, insulating or sealant composition that does not substantially shrink after application. It is another object to provide a foamable composition that, after foaming, may be easily cleaned with water and soap.

SUMMARY OF THE INVENTION

These and other objects are met by the foamable compositions of the instant invention. Compositions in accordance with the invention may be used, for example, to provide latex foam caulk and patching compounds, latex foam stucco including inside and outside wall treatment, ceiling and roof coatings and latex foam adhesives. The compositions may be disposed in pressurized aerosol containers for foamed caulk bead application or they may be contained within large pressurized bulkpacks having flexible hose or gun connectors associated therewith so that building contractors and the like may be readily supplied with larger quantities of the compositions.

Unlike polyurethane foam sealants, compositions in accordance with the invention may be simply washed with water. Current polyurethanes do not wash off but only wear off in time. Also, in contrast to polyurethane based products, the compositions will be more stable due to the urethane's propensity toward uncontrollable expansion. Additionally, foams in accordance with the invention are more "toolable" and provide smoother surfaces upon application than the urethanes.

The compositions in accordance with the invention comprise an aqueous latex emulsion of a film forming polymer. The latex emulsion is water dispersible and can accordingly be washed off the user s hands by soap and water.

The compositions in accordance with the invention also comprise a solid (i.e., at room temperature) foam stabilizer. The foam stabilizer is a waxy material selected from the group of fatty alcohols and fatty acids and diol esters of the fatty acids.

A liquid surfactant is used conjointly with the solid foam stabilizer. Although a variety of different liquid surfactant types may be employed., liquid non-ionic surfactants having an HLB of about 3–14, preferably about 4–10, have proven effective in testing conducted so far.

A host of liquifiable gaseous propellant components can be employed in the composition. However, it is preferred to use a combination of dimethyl ether (DME) and a volatile liquid hydrocarbon wherein the liquid hydrocarbon is present, by volume, in an amount greater than the DME.

Conventional fillers may also be added to the composition to provide anti-sagging or desired pigmentation.

The invention will be further described in conjunction with the appended drawings and detailed description.

DETAILED DESCRIPTION OF THE INVENTION

Figure 1:
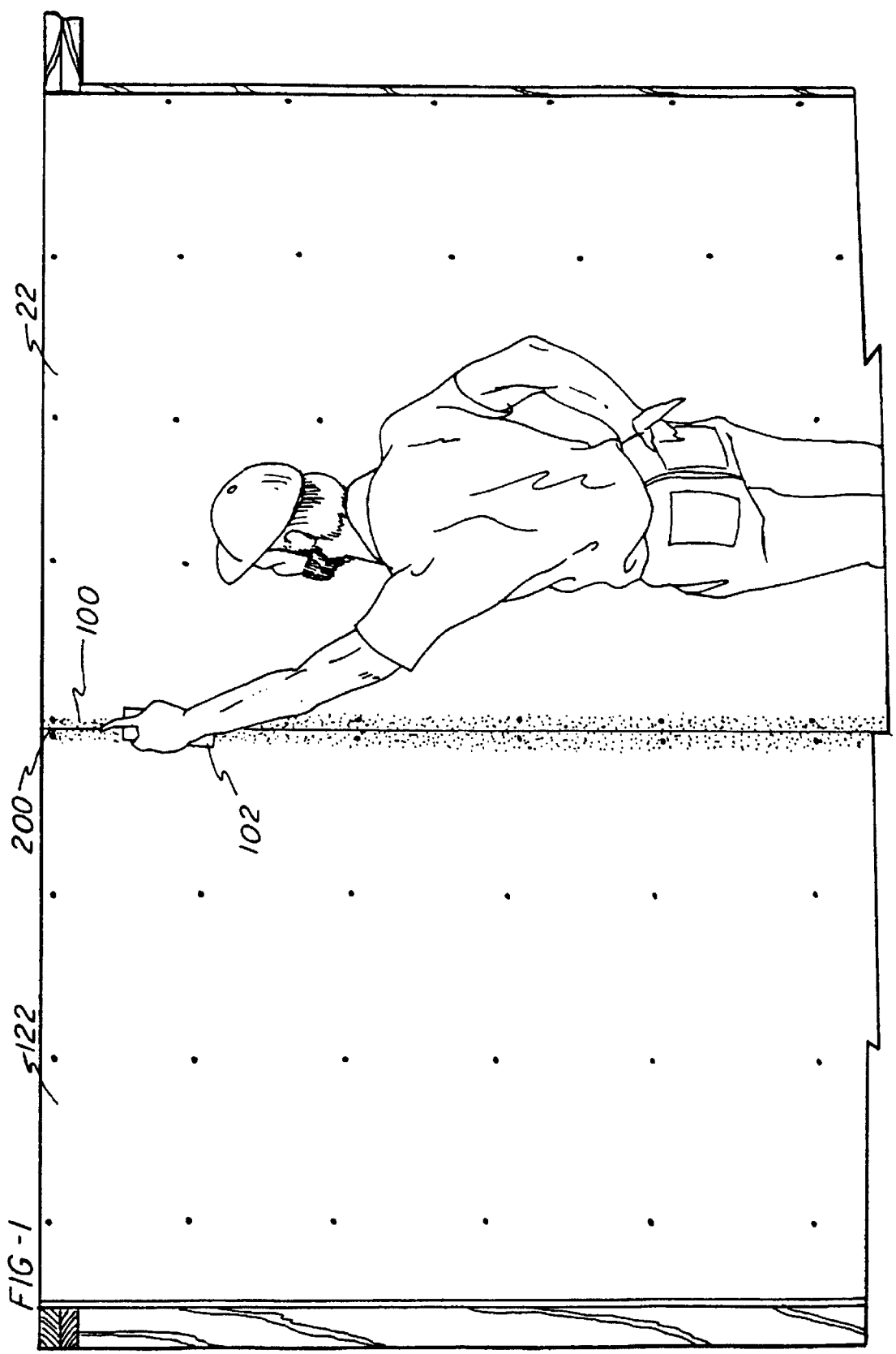
FIG. 1 is a schematic view showing use of the foamable compositions of the invention as a caulk to fill the gaps existing between adjacent wall board panels of a building.

The compositions of the invention are contained, before foaming, in an aerosol or larger bulk quantity container that, after loading with the composition, is charged to sufficient pressure to expel a foamed bead or rope-like strand of material from the housing. Such containers are well known in the art and need not be explained herein. Suffice it here to state that such containers are operatively associated with sufficient value means so as to selectively open the container thereby allowing expulsion of the pressurized components housed therein and to close the container after the desired foamed application. One aerosol container that may be adapted for use in providing a foamed caulk-like product in accordance with the invention is shown in U.S. Pat. No. 3,705,669 (Cox).

The compositions of the invention comprise a film forming polymer present in emulsion form. The film forming polymer may be defined as being dispersible by water when in emulsion form and, the polymer itself is either dispersible in or soluble in the liquid propellant as shall be further specified herein.

By film forming we mean that the polymer, after evaporation of the propellant, should remain in the form of a cohesive foam. Generally, thermoplastic polymers as a class are acceptable as film forming polymers. Polymers derived from ethylenically unsaturated compounds such as styrene and/or acrylic acid and its lower alkyl esters may be mentioned as exemplary along with other vinyl compounds such as vinyl acetate, vinyl butyrate etc. An exemplary listing of suitable film forming polymers can be seen in U.S. Pat. No. 4,381,066 —incorporated by reference herein.

Preferred are latex emulsions comprising acrylic acid, lower alkyl acrylates, styrene, vinyl acetate and/or ethylene based polymers. One preferred combination is a combination of a styrene/acrylic copolymer with a vinylacetate/ethylene copolymer. The glass transition temperatures of the polymeric constituents can vary over a wide range of about −40 to about 110° C. depending on the degree of hardness ultimately desired for the foam.

The propellant constituents can be chosen from a wide variety of liquefiable gaseous compounds such as the $C_1$–$C_6$ and $C_1$–$C_6$ alkenes. In this regard, volatile liquid hydrocarbons such as propane, n-butane, isobutane, hexane, n-pentane, 2-methylbutane, 1-pentene. butene, 2-methyl-2-butene, cyclobutane, cyclopentane and cyclohexane can be employed. Less desirably, halogenated hydrocarbons such as vinyl chloride, methyl chloride, methylbromide, dichlorodifluoromethane 1, 1, 1, 2-tetrafluoroethane and 1, 1-difluroethane etc. may be employed although some of these are not favored due to environment concerns. A detailed listing of liquid propellants may be seen in U.S. Pat. No. 4,381,066 (Page) incorporated by reference herein.

In addition to the volatile liquid hydrocarbon component described above, the propellant preferably comprise dimethyl ether (DME). The amount of the DME in the propellant composition is controlled so that the volatile liquid hydrocarbon is present in a volumetrically greater amount than the DME. For example the volatile liquid hydrocarbon should be present in an amount (by volume) of 1–5:1, preferably 2:1 volatile liquid hydrocarbon: DME. The propellant is added to the foamable composition in an amount of 2–10 wt % based on the total composition weight. Preferably, the propellant is present in an amount of between about 4–6 wt %. It has been found that the use of DME in the propellant enhances quick drying of the resulting foams.

A solid, waxy foam stabilizer is also present in the foamable composition. The foam stabilizer is selected from the group consisting of fatty alcohols, fatty acids and diol esters of such fatty acids such as the alkylene glycol mono and di esters. The term "fatty" as recited herein shall mean about $C_{14}$—about $C_{24}$ alkyl chains. The following may be mentioned as exemplary:

| Fatty Alcohols |  |
|---|---|
| stearyl alcohol $CH_3(CH_2)_{17}OH$ | |
| cetyl alcohol $CH_3(CH_2)_{15}OH$ | |
| myristyl alcohol $CH_3(CH_2)_{13}OH$ | |
| Fatty Acids | |
| stearic acid $CH_3(CH_2)_{16}COOH$ | |
| cetic acid $CH_3(CH_2)_{14}COOH$ | |
| myristic acid $CH_3(CH_2)_{12}COOH$ | (preliminary results here indicate that foam fails after about 2–5 min) |
| Esters | |
| ethylene glycol distearate | |
| ethylene glycol monostearate | |
| propylene glycol monostearate | |

In addition to the normally solid foam stabilizer, a liquid lipophilic surfactant is employed to function at the liquid/oil interface. A host of liquid surfactants may be used. Preferred are the liquid non-ionic surfactants having HLB values of about 3–14, preferably about 4–10. Of this class, the non-ionic liquid fatty alcohol ethers and PEG castor oils may be mentioned. Preliminary data indicates that the ethoxylated fatty alcohol ethers such as ethoxylated (2) oleyl ether (Brij 93-available from ICI, HLB of 4.9) are quite effective. The polyethylene glycol ethers of castor oil have proven effective in preliminary tests.

One product that combines the solid, waxy foam stabilizer and surfactant is commercially available under the Incroquat CR designation from Croda. This surfactant product is a mixture of cetyl alcohol, PEG-40 castor oil and a quatemary arnnonium salt cationic surfactant. stearylalkonium chloride. The stearylalkonium chloride component is reportedly present in an amount of about 15%. It is thought that the effective components of this product. from the viewpoint of enhancing foam stability, are the cetyl alcohol (present in dispersed form in the commercially available product and acting as the solid foam stabilizer) and the PEG-40 castor oil acting as an emulsifying agent.

The liquid surfactant and waxy, solid foam stabilizer are present in an amount of about 1–5:5–1 parts by weight with a (1:2) ratio being preferred.

In addition to the above components, the foamable compositions may also comprise a dispersant/solvent such as isopropanol to aid in dispersing the surfactant and the waxy solid upon melting thereof. Isopropanol also aids in foam drying and acts as a heat sink when the solid surfactant is melted and mixed during preparation of the foamable formulation.

Other components including fillers such as silica, asbestos, chalk, titanium dioxide, zinc oxide. siloxanes, sundry other pigments and calcium carbonate etc. can optionally be added. Ethylene glycol and other freeze-thaw agents can be included in the formulation. Flame retardant compounds can also be noted as possibly being added. These include antimony oxides, brominated and chlorinated paraffins, $Al(OH)_3$ and aromatic flame retardants. All of these compounds are referred to herein broadly as "fillers".

In addition, water repellent compounds can be included in the formulation as needed. In this regard a host of such compounds are commercially available and could be used. Exemplary water repellent compounds include the siloxanes, waxes and cationic water repellents. Preliminary data suggests that the cationic water repellents provide enhanced water repelling function without causing excessive "sag" in the foamed formulation. At present, the cationic amines such as the quaternary ammonium salts are preferred. One such product is available under the trademark Mackernium SDC-85 from McIntyre Group Ltd., University Park, Ill. This product is a stearalkonium chloride available in flake form.

If ferrous metal containers are used to house the formulation, it may be desirable to add a minor amount of a rust inhibitor component to the formulation. These again are available from many commercial suppliers. One such exemplary rust inhibitor is available from Raybo Chemical Co., under the trademark "Raybo 60 No Rust".

Anti-microbial agents such as fungicides, algaecides, mildewicides, etc. may also be added to the formulation. One such fungicide is sold under the mark "Polyphase AFl" and is available from Troy Chemical.

Exemplary compositions include the following components (components a, b, c, d & e all add up to 100%):

| a) | film forming o/w polymer emulsion | 60–97 | (wt % based upon weight of foamable composition prior to charge of propellant) |
|---|---|---|---|
| b) | waxy, solid foam stabilizer | 1–10 | (wt % based upon weight of foamable composition prior to charge of propellant) |

|   |   |   |   |
|---|---|---|---|
| c) | surfactant | 1–10 | (wt % based upon weight of foamable composition prior to charge of propellant) |
| d) | dispersant/ solvent | 1–10 | (wt % based upon weight of foamable composition prior to charge of propellant) |
| e) | fillers | 0–40 | (wt % based upon weight of foamable composition prior to charge of propellant) |
| f) | water repellents | 0–5 | (wt % based upon weight of foamable composition prior to charge of propellant) |
| g) | rust inhibitors | 0–5 | (wt % based upon weight of foamable composition prior to charge of propellant) |
| h) | anti microbial agents | 0–5 | (wt % based upon weight of foamable composition prior to charge of propellant) |
| (a)(b)(c)(d)(e)(f)(g) and (h) add up to 100 wt % | | | |
| | propellant | 2–10 | (wt % based upon weight of the composition including propellant) |

Usually, the waxy solid foam stabilizer is melted and mixed with the dispersant/solvent and the surfactant. Then this mixture is added to the requisite polymer emulsion(s). Fillers are then added as desired. The mixture is added to the desired container and charged with propellant in an amount of about 2–10wt %. Optimal pressure within the container is around 10 psig at room temperature.

EXAMPLES

The following screening test was employed in order to determine if stable foams were produced by the tested candidate formulations.

Preparation of Screening Formulations

The waxy solid foam stabilizer was melted and mixed with isopropanol. The surfactants and requisite polymer latex(s) were then added to the resulting mix. About 340 grams of the resulting emulsion were then charged into an aerosol container along with a liquid propellant mixture comprising "A-70" liquid hydrocarbon propellant (i.e., propane isopropane and n-butane) and dimethylether (DME). The total charge of propellant was about 4–6 wt % based on the combined weight of the emulsion and propellant. The "A-70" was present in an amount of 2:1 parts by volume "A-70":DME.

Expansion Tests

The screening formulations were then sprayed from the canister in the form of foam-like beads. The initial height of each bead was measured and then the height was measured again after 18–24 hours. Expansion (or contraction) was measured in accordance with formula $$\frac{\text{bead height after 18-24 hours}^2}{\text{initial bead height}} = \text{volumetric increase}$$

Volumetric increases of the order of about 0.4 and greater were deemed acceptable. Most desirable are expansions of 0.6 to 1 and greater. In some cases subjective evaluation of foam stability in the form of pass P or fail F was made. Results of these tests are shown in Table 1.

TABLE 1

| Example # | Waxy, Solid Foam Stabilizer | Surfactant | HLB | Surfactant Chemical Description | Expansion |
|---|---|---|---|---|---|
| 1. | stearyl alcohol | Hextoxide C-9 | 6.0 | PEG-9 castor oil | 0.65 |
| 2. | stearyl alcohol | Hextoxide C-15 | 8.3 | PEG-15 castor oil | 0.89 |
| 3. | stearyl alcohol | Hextoxide C-25 | 10.8 | PEG-25 castor oil | 0.68 |
| 4. | stearyl alcohol | Hextoxide C-40 | 13.1 | PEG-40 castor oil | 0.65 |
| 5.* | cetyl alcohol | Incroquat CR | — | PEG40 castor oil/stearyl-alkonium chloride | 1.6 |
| 6.** | cetyl alcohol | Incroquat CR | — | PEG40 castor oil/stearyl-alkonium chloride | 0.37 |
| 7. | Pegosperse 50 DS ethylene glycol distearate HLB - 2 | Brij 93 | 4.9 | POE(2) oleyl ether | 1.34 |
| 8. | Pegosperse 50 MS ethylene glycol monostearate HLB 3.0 | Brij 93 | 4.9 | POE(2) oleyl ether | 1.49 |
| 9. | stearyl alcohol | Brij 93 | 4.9 | POE(2) oleyl ether | 1.51 |
| 10. | cetyl alcohol | Brij 93 | 4.9 | POE(2) oleyl ether | 1.13 |
| 11. | myristyl alcohol | Brij 93 | 4.9 | POE(2) oleyl ether | 1.32 |
| 12. | stearic acid | Brij 93 | 4.9 | POE(2) oleyl ether | 1.09 |
| 12a. | stearalkonium chloride Mackernium SDC-85 | Brij 93 | 4.9 | POE(2) oleyl ether | 0.48 |
| 12b. | witconol 2380 propylene glycol mono stearate | Brij 93 | 4.9 | POE(2) oleyl ether | 1.49 |
| 13. | cetic acid | Brij 93 | 4.9 | POE(2) oleyl ether | 1.13 |
| 14. | myristic acid | Brij 93 | 4.9 | POE(2) oleyl ether | 0.12 |

*Incroquat is a surfactant product comprising cetyl alcohol, PEG40 castor oil and stearyalkonium chloride - Example 5 present 5.5%
**Example 6 Incroquat present 1.8%
P = passed foam expansion test (control run with cetyl alcohol only failed to provide foam stability).

| Composition of Formulations Screened | 1–4 | 5 | 6 | 12 a & b + 7–14 |
|---|---|---|---|---|
| Surfactant | 2.8 | 1.8 | 5.5 | 1.8 |
| IPA | 1.4 | 1.4 | 1.4 | 5.0 |
| styrene/acrylic copolymer | 22.6 | 23.5 | 22.6 | 22.6 |
| vinyl acetate/ethylene copolymer | 33.5 | 34.8 | 33.5 | 33.6 |
| waxy, solid foam stabilizer | 2.8 | NA | NA | NA |
| ethylene glycol | — | — | — | — |
| water | remainder wt % | | | |

NA = not available; % of dispersed solids in commercial product not disclosed.

The surfactants above were available from the following suppliers:

Hextoxides available from Heterene
Incroquat available from Croda
Brijs available from ICI
Pegosperses available from Lonza Comparative Tests The following waxy solid and surfactant combinations were tested. The formulations used (except for waxy solid type) were as specified above except where noted to the contrary. Results are shown in Table 2.

TABLE 2

| Comparative Example # | Waxy Solid Foam Stabilizer | Surfactant | HLB | Surfactant Chemical Description | Expansion |
|---|---|---|---|---|---|
| C-1 | Tristearin Octadecanoic acid -1,2,3-propane triylester) | Brij 93 | 4.9 | POE(2) oleyl ether | F |
| C-2 | stearyl stearate | Brij 93 | 4.9 | POE(2) oleyl ether | F |
| C-3 | lauryl alcohol | Brij 93 | 4.9 | POE(2) oleyl ether | F |
| C-4 | Myristyl stearate | Brij 93 | 4.9 | POE(2) oleyl ether | F |
| C-5 | Abil wax 2440 (dialkoxy dimethyl polysiloxane) | Abil EM-90 | 5.0 | Cetyl dimethicone copolyol | F |
| C-6 | Cetyl alcohol | Abil EM-90 | 5.0 | Cetyl dimethicone copolyol | F |

Based on presently available data. the composition preferred for use is as follows.

| | |
|---|---|
| MacKernium SDC-85 | 0.7% |
| Brij 93 | 1.8% |
| Waxy, solid foam stabilizer | 3.6% |
| IPA | 4.0% |
| Ethylene glycol | 2.0% |
| Raybo 60 No Rust | 1.25% |
| Polymer a) Styrene/acrylic copolymer; solids = 48.5%, $T_g$ = 103° C. Lucidene 370, available Morton International Solids present | 21.01% |
| b) Polyvinyl acetate/ ethylene copolymer; solids = 72.0%; $T_g \approx$ 0° C.; Airflex 720 BP, available Air Products Solids present | 31.19% |
| water | remainder |

To these emulsions, a propellant as described above (preferably 2:1-by volume-A-70: DME) is added in an amount of about 4.95% based on the weight of all components (including propellant) present.

Although applicant is not to be bound to any particular theory of operation, it is thought that the liquid surfactant emulsifies the volatile liquid hydrocarbon propellant component. The waxy solid stabilizes the latex foam by crystallizing around the emulsified oil droplet upon extrusion.

The foamable compositions in accordance with the invention can be utilized to fill joints, cracks, crevices, gaps, or other spaces in or between building or structural units. For example, in FIG. 1, the foamed composition 100 is applied to seal cracks 20 that exist between adjacent wall board members 22 of the building structure. The foamable composition 100 is supplied to the crack from a pressurized spray canister 102.

Figure 2:
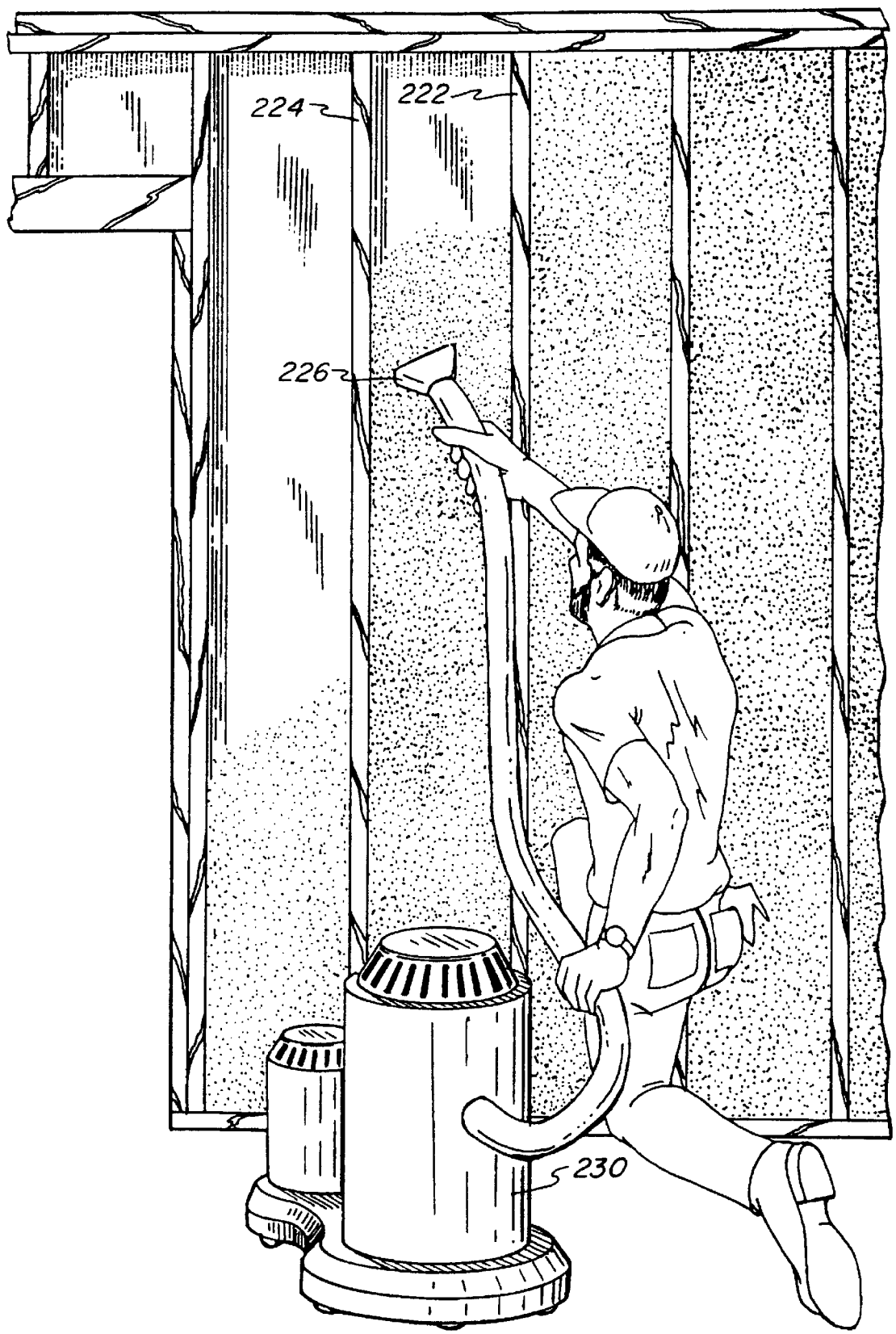
FIG. 2 is a schematic view showing use of the compositions to insulate building structures.

Similarly, the foamable compositions can be utilized to provide insulation in the construction industry. With regard to FIG. 2, the composition is applied in foamable form between wall stud members 222, 224. Here, the foamable composition is supplied through a wide-mouth nozzle means 226 from an enlarged pressurized canister 230 that may be conveniently strapped onto the back of the worker. In such manner, foams in accordance with the invention can be applied to provide thermal insulating sound dampening or moisture barrier like properties.

Figure 3:
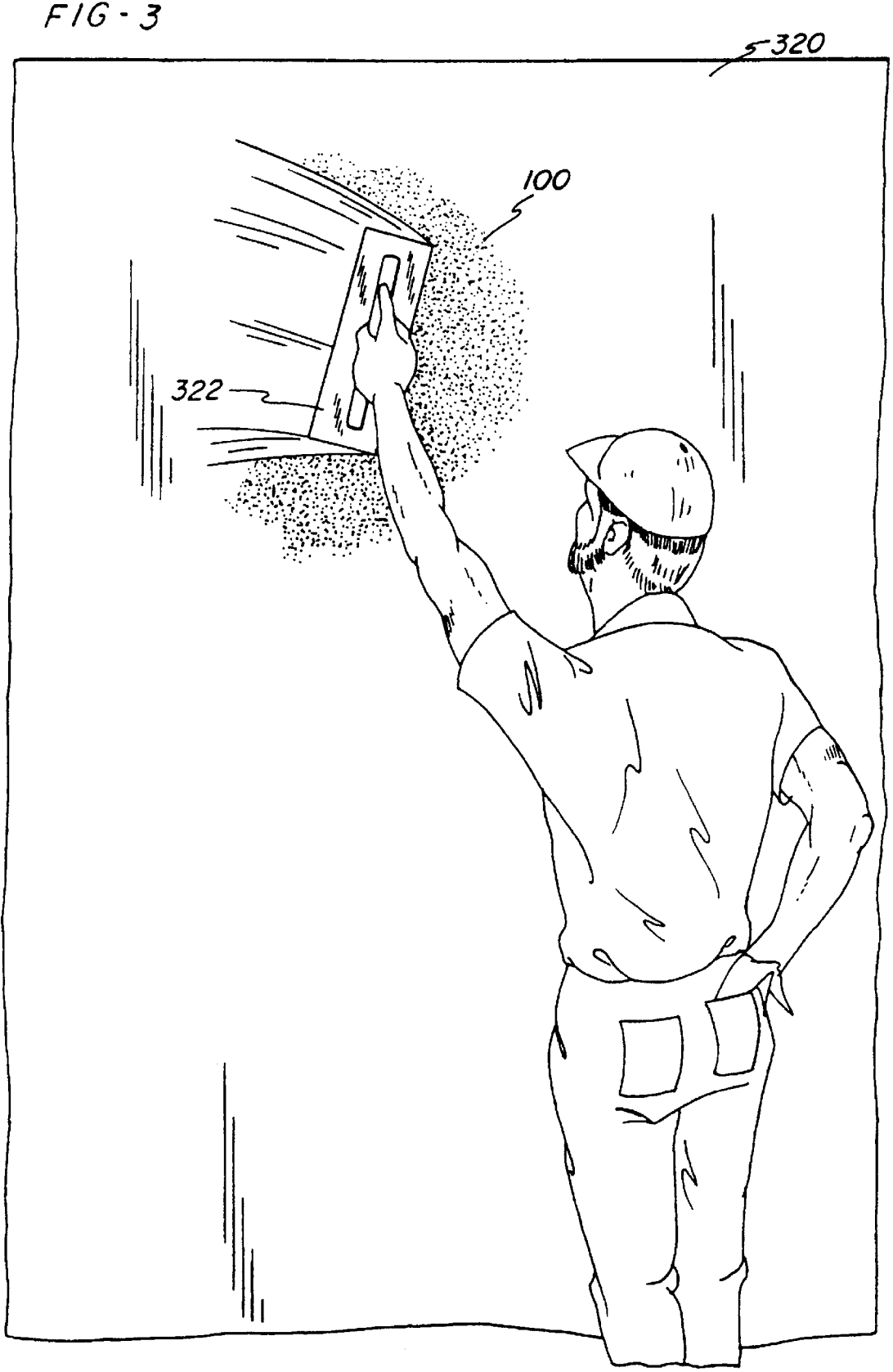
FIG. 3 is a schematic view highlighting use of the compositions of the invention in wall patching methods.

The compositions in accordance with the invention may be applied with appropriate tools or the like to the requisite substrate. As shown in FIG. 3, the foamable composition 100 of the invention is utilized as a patching material to fill concavities, or holes in the wall surface 320. The user simply applies a mass or mound of the composition 100 into the desired concavity and works the composition with a trough 322. After the foamable composition sets up, a smooth surface is provided.

Figure 4:
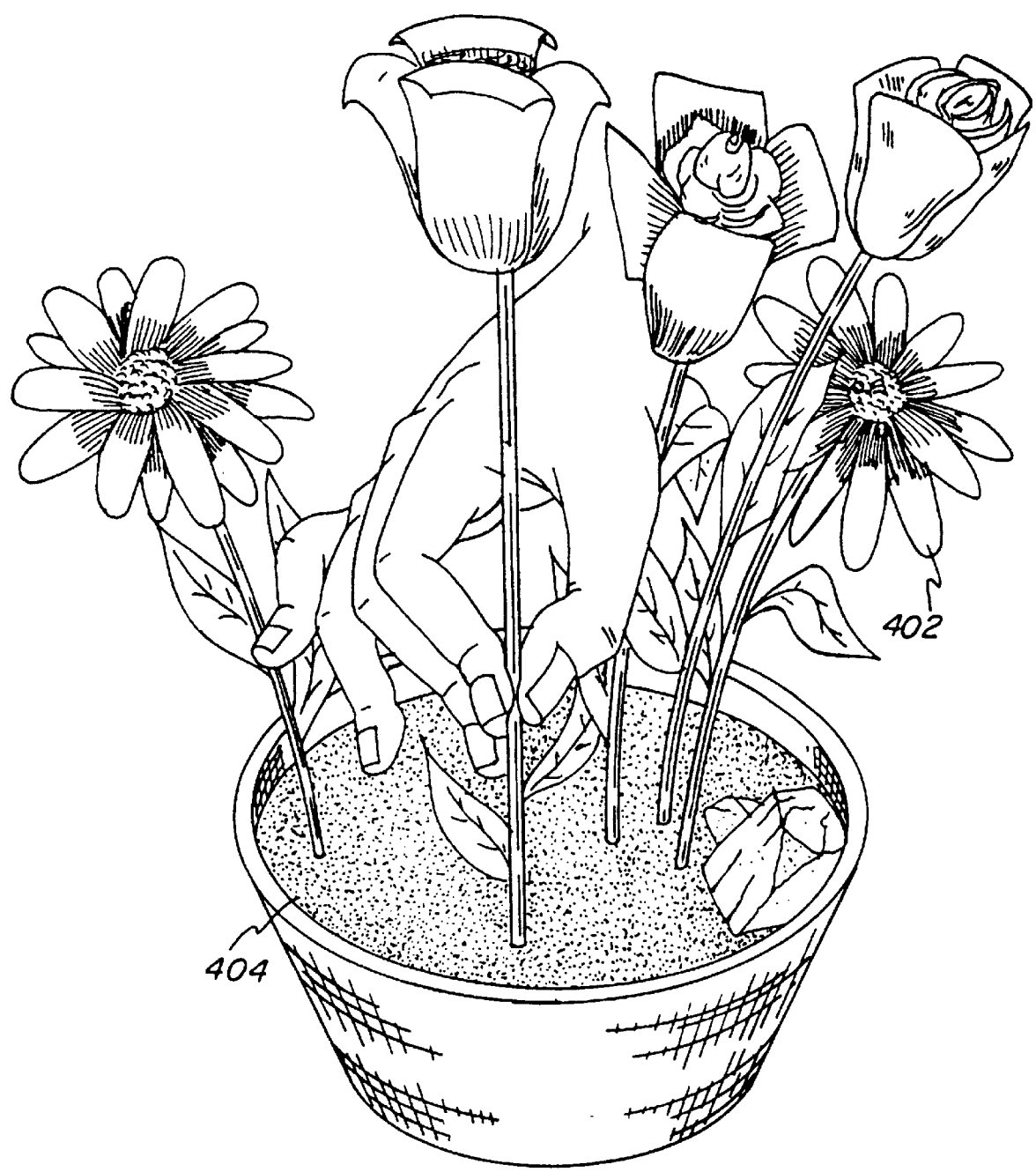
FIG. 4 is a schematic view showing an artificial terrain composed of the instant foamable compositions, shown here as a mount for a floral display.

As shown in FIG. 4, the foamable composition may also be utilized to provide an artificial terrain 404, for a variety of craft and hobby purposes. Here, the foamable composition is supplied, and formed into the requisite artificial terrain 404 which provides as an anchor site or means for supporting a plurality of flowers 402. Although the artificial terrain 404 is shown here in conjunction with and as providing a support for flowers 402, the foamable compositions can be used to supply similar terrains or background materials for a host of other craft or hobby items.

Figure 5:
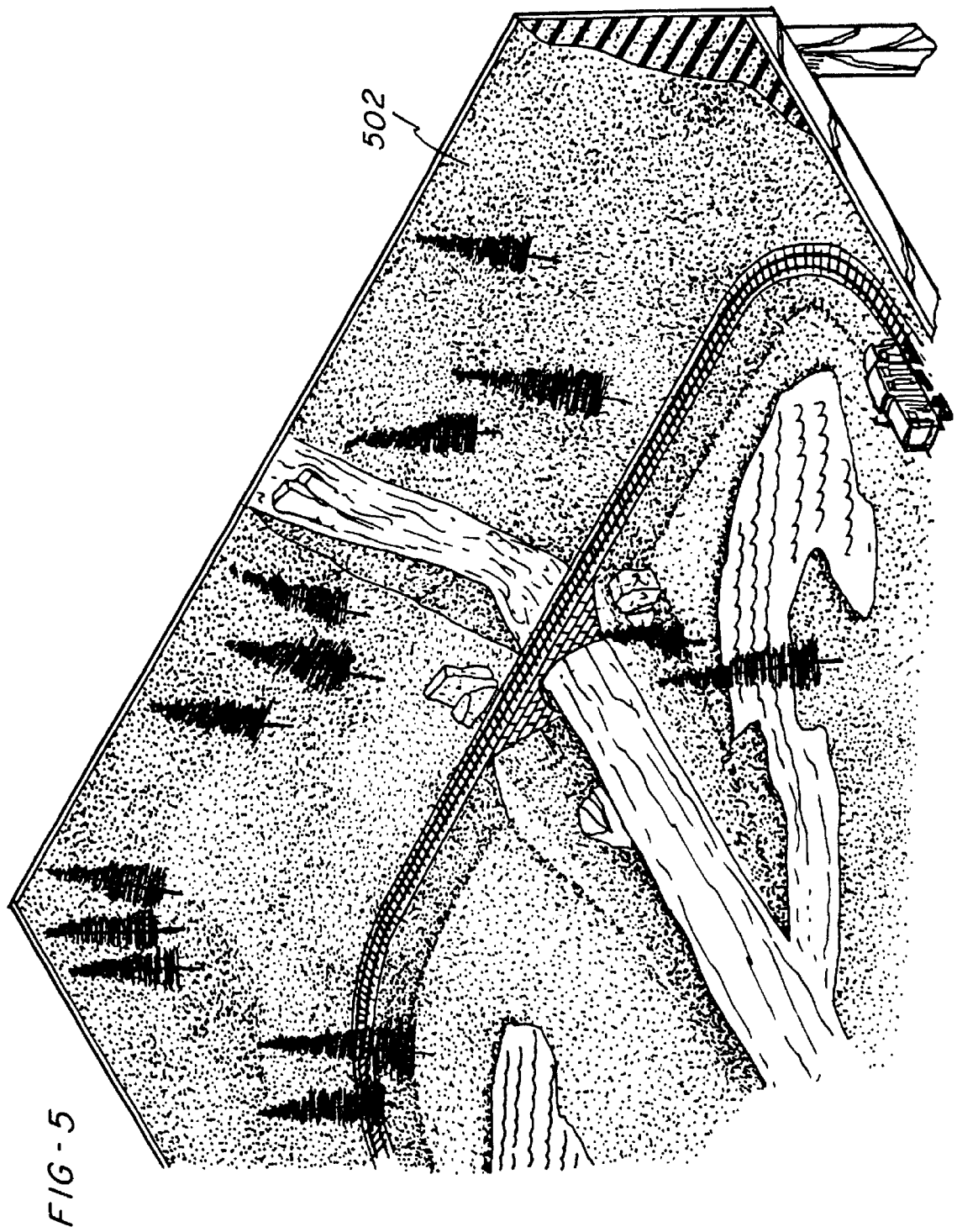
FIG. 5 is a schematic view of a model train set-up, having an artificial terrain background composed of the foamable compositions of the invention.

In FIG. 5, the scenic background 502 formed of the foamable compositions of the invention, is utilized to provide a planned, artificial topography for a model railroad set.

The latex polymer foam compositions of the invention have a natural home in the craft market due to the convenience and safety of a water based foam. The toy market for this foam technology is attractive for the same reasons. This latex polymer foam technology has application in automotive and industrial equipment manufacturing as an insulating sealant or adhesive. Other industrial applications may include the use of open-celled foams for sewage treatment, filtration devices, anion/cation exchange resins, and microbiological growth medias, Medical applications could include the investigation of open-celled foams for tissue grafting or biomedical implants and stabilization of biological macromolecules such as proteins, cellulosics, and polysaccharides into foam products.

The foams in accordance with the invention may be used as an encapsulating or coating medium for application over toxic and/or other hazardous materials. For example, asbestos bearing structural units such as walls, roofs and flooring may simply be coated with the foam compositions. After drying, the thus covered structural units would exhibit reduced airborne contaminant expulsion. Possibly the foams could even be used to encapsulate radioactive materials.

As previously noted, latex foam compositions of the invention may be used as a foam insulating sealant, ceiling texture, non-shrink caulk, textured patching compound, stucco repair product, white glue, construction adhesive, spackling and hand cleanser. There are a myriad of other potential uses for these compositions. The following are mentioned as possibilities:

1) crack filling applications
2) component in wallboard tapelmud replacement products
3) component in driveway crack sealer
4) component in foam-in-place bug repellant
5) component in smoke/fire containment product
6) pipe insulation sealant
7) painter's caulk
8) component in foam-in-place gasket material
9) component in sound absorber
10) component in adhesive grout
11) component in alignment aid—temporary tack-in-place
12) component in foam-in-place leveler/gap filler/adhesive
13) component in replacement for white glues
14) component in bulk caulk delivery system
15) component in moisture barrier Many of these compositions lend themselves to bulk application techniques well suited for the manufactured housing market. Others like the patching and repair products are better suited to the convenient "no gun needed" aerosol can.

Unlike competitive polyurethane foams the instant foamable compositions contain no isocyanates which are skin and respiratory sensitizers. (Once sensitized, exposure to isocynates can cause respiratory failure.) The instant compositions will not permanently bond to the skin and can be easily removed by water cleanup. Polyurethane requires a hazardous flammable solvent for its removal. The compositions of the invention are easy to control during application. They are toolable and moldable, and they are reusable eliminating the waste and mess of polyurethane foam. Moreover, the foam compositions are paintable with all paints. Oil based paints (including virtually all spray paint) will dissolve polyurethane foam.

The instant foam compositions do not require painting for exterior applications because they are UV stable. They remain white and will not discolor or degrade like polyurethane foam. The compositions exhibit no hydraulic effect to cause buckling or structural failure.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Foamable composition adapted for storage in a pressurized aerosol container having a valve associated therewith for dispensing the contents of said container in the form of a foam, said composition comprising (a) an aqueous emulsion comprising a film forming polymer;
    (b) a liquid propellant;
    (c) a solid, waxy foam stabilizer; and
    (d) a liquid lipophilic surfactant having an HLB value of about 3 to 14.

2. Composition as recited in claim 1 wherein said film forming polymer comprises an emulsion including polyvinylacetate/ethylene copolymer and styrene/acrylic copolymer.

3. Composition as recited in claim 1 wherein said liquid propellant comprises a liquefied gas component selected from the group consisting of lower ($C_1$–$C_6$) alkanes and lower ($C_1$–$C_6$) alkenes.

4. Composition as recited in claim 3 wherein said lower ($C_1$–$C_6$) alkane is present and comprises propane, isobutane, and n-butane.

5. Composition as recited in claim 4 wherein said liquid propellant further comprises dimethyl ether (DME) and wherein said DME is present in a ratio by volume of DME: lower ($C_1$–$C_6$) alkane of from about 1:1-5.

6. Composition as recited in claim 5 wherein said DME is present in a ratio by volume of DME: lower ($C_1$–$C_6$) alkane of about 1:2.

7. Composition as recited in claim 1 wherein said liquid, lipophilic surfactant has an HLB of about 4–10.

8. Composition as recited in claim 7 wherein said liquid lipophilic surfactant comprise a member from the group consisting of fatty alcohol ethers and ethoxylated castor oils.

9. Composition as recited in claim 8 wherein said fatty alcohol ether comprises ethoxylated (2) oleyl ether.

10. Composition as recited in claim 1 wherein said solid waxy foam stabilizer comprises a member selected from the group consisting of fatty alcohols, fatty acids and diol esters of said fatty acids.

11. Composition as recited in claim 10 wherein said solid waxy foam stabilizer comprises stearyl alcohol.

12. Composition as recited in claim 10 wherein said solid waxy foam stabilizer comprises cetyl alcohol.

13. Composition as recited in claim 10 wherein said solid waxy foam stabilizer comprises myristyl alcohol.

14. Composition as recited in claim 10 wherein said solid waxy foam stabilizer comprises stearic acid.

15. Composition as recited in claim 10 wherein said solid waxy foam stabilizer comprises cetic acid.

16. Composition as recited in claim 10 wherein said solid waxy foam stabilizer comprises an alkylene glycol ester of said fatty acids.

17. Composition as recited in claim 16 wherein said alkylene glycol ester comprises a member selected from ethylene glycol distearate and propylene glycol monostearate and ethylene glycol monostearate.

* * * * *